(12) United States Patent
Tsuboi (10) Patent No.: US 10,447,384 B2
(45) Date of Patent: Oct. 15, 2019

(54) COMMUNICATION APPARATUS, COMMUNICATION METHOD, AND PROGRAM

(71) Applicant: HONDA MOTOR CO., LTD., Minato-ku, Tokyo (JP)

(72) Inventor: Michitaka Tsuboi, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 15/916,407

(22) Filed: Mar. 9, 2018

(65) Prior Publication Data
US 2018/0269961 A1    Sep. 20, 2018

(30) Foreign Application Priority Data

Mar. 17, 2017  (JP) ................. 2017-052357

(51) Int. Cl.
| | |
|---|---|
| *H04B 7/185* | (2006.01) |
| *H04L 12/64* | (2006.01) |
| *H04L 12/12* | (2006.01) |
| *H04B 1/3822* | (2015.01) |
| *H04L 12/40* | (2006.01) |

(52) U.S. Cl.
CPC ....... *H04B 7/18584* (2013.01); *H04B 1/3822* (2013.01); *H04L 12/12* (2013.01); *H04L 12/40006* (2013.01); *H04L 12/6418* (2013.01)

(58) Field of Classification Search
CPC ... H04B 7/18584; H04B 1/3822; H04L 12/12; H04L 12/40006; H04L 12/6418
See application file for complete search history.

(56) References Cited

U.S. PATENT DOCUMENTS

| | | | |
|---|---|---|---|
| 2013/0250846 A1* | 9/2013 | Matsumoto | H04B 7/15564 370/315 |
| 2014/0036693 A1* | 2/2014 | Mabuchi | H04L 43/10 370/243 |
| 2017/0280297 A1* | 9/2017 | Skaaksrud | H04L 67/303 |

FOREIGN PATENT DOCUMENTS

| | | |
|---|---|---|
| JP | 2006-253922 | 9/2006 |
| JP | 2015-168376 | 9/2015 |
| WO | 2010/052892 | 5/2010 |

OTHER PUBLICATIONS

Japanese Notice of Allowance for Japanese Patent Application No. 2017-052357 dated Aug. 21, 2018.

* cited by examiner

*Primary Examiner* — Duc C Ho
(74) *Attorney, Agent, or Firm* — Amin, Turocy & Watson LLP (57) ABSTRACT

A communication apparatus of an embodiment includes: a communication unit that is capable of communicating with a first communication path and a second communication path; and a communication control part that controls the communication unit and that transmits a signal to the second communication path based on a signal which is received from the first communication path, wherein when a number of signals that are received from the first communication path in a first predetermined time span is more than a predetermined number, the communication control part performs a control such that a relationship between a number m1 of signals which are received from the first communication path and a number m2 of signals which are transmitted to the second communication path becomes m1>m2.

7 Claims, 9 Drawing Sheets

COMMUNICATION APPARATUS, COMMUNICATION METHOD, AND PROGRAM

CROSS-REFERENCE TO RELATED APPLICATION

Priority is claimed on Japanese Patent Application No. 2017-052357, filed on Mar. 17, 2017, the contents of which are incorporated herein by reference.

BACKGROUND

Field of the Invention

The present invention relates to a communication apparatus, a communication method, and a program.

Background

In the related art, an apparatus is known which relays information that is acquired from a predetermined communication path to another communication path in an in-vehicle network (for example, refer to Japanese Patent Application, Publication No. 2015-168376A). The apparatus determines whether or not an information communication by forwarding a communication message is required on the basis of information that is used for the determination of necessity of a communication which is set in a storage unit and information such as information that is input from an external apparatus or information of an ECU (Electronic Control Unit) that is performing a communication.

SUMMARY

However, there is a case in which the apparatus described above may cause the state of a traffic of a receiving-side communication path to propagate to a transmitting-side communication path.

An object of an aspect of the present invention is to provide a communication apparatus, a communication method, and a program that are capable of preventing the state of a receiving-side communication path from propagating to a transmitting-side communication path.

(1) A communication apparatus according to an aspect of the present invention includes: a communication unit that is capable of communicating with a first communication path and a second communication path; and a communication control part that controls the communication unit and that transmits a signal to the second communication path based on a signal which is received from the first communication path, wherein when a number of signals that are received from the first communication path in a first predetermined time span is more than a predetermined number, the communication control part performs a control such that a relationship between a number m1 of signals which are received from the first communication path and a number m2 of signals which are transmitted to the second communication path becomes m1>m2.

(2) In the above communication apparatus, when a number of signals that are received from the first communication path in the first predetermined time span is more than a predetermined number, the communication control part may transmit the signal to the second communication path at a period that is longer compared to a period at which a signal is received from the first communication path.

(3) In the above communication apparatus, the communication control part may transmit the signal to the second communication path at a predetermined period.

(4) In the above communication apparatus, the first predetermined time span may be a time span from when the communication control part transmits a signal to the second communication path to when the predetermined period comes next, and the predetermined number may be one.

(5) In the above communication apparatus, when a number of signals that have a predetermined identifier and that are received from the first communication path in the first predetermined time span is more than a predetermined number, the communication control part may perform a control such that with respect to the signal having a predetermined identifier, a relationship between a number m1 of signals which are received from the first communication path and a number m2 of signals which are transmitted to the second communication path becomes m1>m2.

(6) Another aspect of the present invention is a communication method in which a computer provided on a vehicle controls a communication unit that is capable of communicating with a first communication path and a second communication path to transmit a signal to the second communication path based on a signal which is received from the first communication path, the method including: determining whether or not a number of signals that are received from the first communication path in a first predetermined time span is more than a predetermined number based on a reception result of a signal from the first communication path; and when it is determined that the number is more than the predetermined number, performing a control such that a relationship between a number m1 of signals which are received from the first communication path and a number m2 of signals which are transmitted to the second communication path becomes m1>m2.

(7) Still another aspect of the present invention is a non-transitory computer-readable recording medium including a program that causes a computer provided on a vehicle to control a communication unit which is capable of communicating with a first communication path and a second communication path to transmit a signal to the second communication path based on a signal which is received from the first communication path, the program causing the computer to: determine whether or not a number of signals that are received from the first communication path in a first predetermined time span is more than a predetermined number based on a reception result of a signal from the first communication path; and when it is determined that the number is more than the predetermined number, perform a control such that a relationship between a number m1 of signals which are received from the first communication path and a number m2 of signals which are transmitted to the second communication path becomes m1>m2.

According to the configurations (1) to (7) described above, it is possible to prevent a receiving-side communication state from propagating to a transmitting-side communication path.

DESCRIPTION OF THE EMBODIMENTS

Hereinafter, embodiments of a communication apparatus, a communication method, and a program of the present invention will be described with reference to the drawings.

First Embodiment

Figure 1:
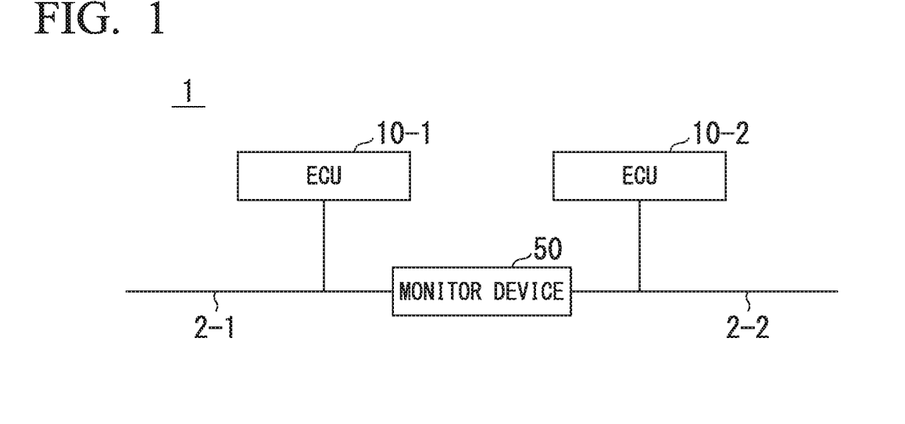
FIG. 1 is a view showing a configuration of a communication system.

FIG. 1 is a view showing a configuration of a communication system 1. The communication system 1 is provided, for example, on a vehicle and establishes a network in the vehicle. The communication system 1 includes an ECU 10-1 that is connected to a first communication path 2-1, an ECU 10-2 that is connected to a second communication path 2-2, and a monitor device 50 (communication apparatus) that is connected to and between the first communication path 2-1 and the second communication path 2-2. Hereinafter, when the first communication path 2-1 and the second communication path 2-2 are not distinguished from each other, the first communication path 2-1 and the second communication path 2-2 are referred to a communication path 2. Hereinafter, when the ECU 10-1 and the ECU 10-2 are not distinguished from each other, the ECU 10-1 and the ECU 10-2 are simply referred to an ECU 10. The number of the ECUs 10 is not limited to two and may be three or more.

In the communication system 1, for example, communications on the basis of a communication scheme such as a CAN (Controller Area Network) protocol and an IEEE 802.3 are performed via the communication path 2.

The ECU 10 is, for example, an engine ECU that controls an engine, a seat belt ECU that controls a seat belt, or the like. The ECU 10 receives a frame (signal) that is transmitted to the network of the communication system 1. Hereinafter, each frame that is transmitted to the network will be referred to as a frame f. An identifier (hereinafter, referred to as an ID) is assigned to each of the frames f. A storage unit of the ECU 10 stores information of an identifier (hereinafter, referred to as a registered ID) used as an object to be processed by the ECU 10. When the frames f are received, with reference to IDs assigned to the received frames f, the ECU 10 extracts and acquires a frame f with the same ID as the registered ID and does not acquire a frame f with an ID different from the registered ID as a frame f other than the object to be processed.

A format example of a frame f that is transmitted to the communication path 2 by the ECU 10 will be described. A frame f that is transmitted in one-time transmission includes, for example, a start-of-frame (SOF) representing the start of the frame f, an ID which is an identifier of the frame f, a remote transmission request (RTR) for identifying the frame f and a remote frame (a frame obtained by excluding a frame field from the frame f), a control field representing the number of bytes and the like of the frame f, a frame field which is the main body of the frame f to be transmitted, a CRC sequence applying a CRC for checking an error of the frame f, an ACK slot and an ACK delimiter receiving a notification (an ACK notification) from a unit (for example, an ECU) having received a correct message, an end-of-frame (EOF) representing the end of the frame f, and the like.

In the communication path 2, communication arbitration on the basis of a priority that is represented by the ID and the RTR is performed. When frames f are simultaneously transmitted from a plurality of ECUs 10, the ECUs 10 compare the frames f transmitted by themselves with a monitoring result of the state of the communication path 2. When a recessive and a dominant are simultaneously transmitted from separate ECUs 10, the dominant takes a priority, and the state of the communication path 2 becomes dominant. At this time, the ECU 10 having transmitted the recessive determines that the communication arbitration is failed due to the recessive transmitted by the ECU 10 and the state of the communication path 2 being different from each other and stops the transmission of the frame f. Thereby, in a case where when the transmission of the frames f is simultaneously started from the plurality of ECUs 10, while one ECU 10 is performing recessive transmission, the other ECU 10 transmits a dominant, the ECU 10 having transmitted the dominant succeeds in the communication arbitration, and therefore, the priority of a frame f having a smaller ID value is higher.

The monitor device 50 is a gateway (relay device) that transmits a frame f which is acquired via the communication path 2 to a device or the like that is different from a transmission origin via the communication path 2.

Figure 2:
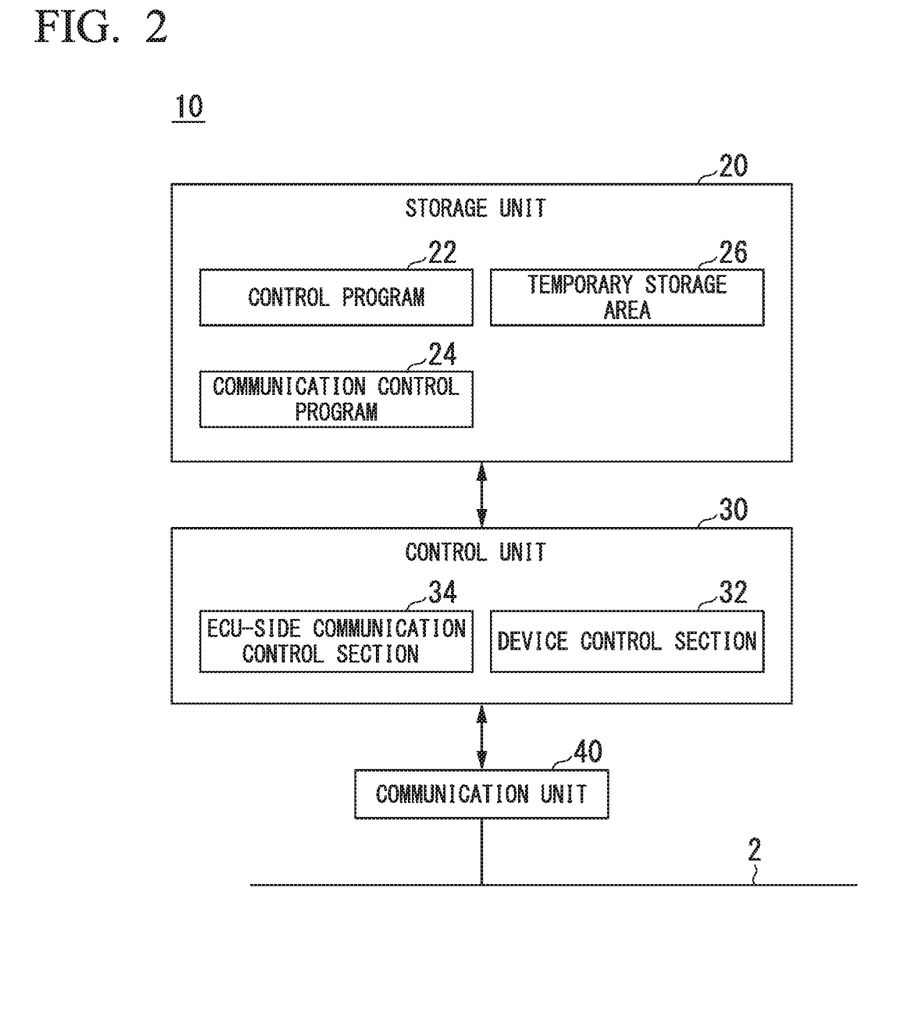
FIG. 2 is a view showing a functional configuration of an ECU.

FIG. 2 is a view showing a functional configuration of the ECU 10. The ECU 10 includes, for example, a storage unit 20, a control unit 30, and a communication unit 40. For example, a processor such as a CPU (Central Processing Unit) executes a program stored in the storage unit 20, and thereby, the control unit 30 is implemented. The control unit 30 may be implemented by hardware such as a LSI (Large Scale Integration), an ASIC (Application Specific Integrated Circuit), and a FPGA (Field-Programmable Gate Array) and may have a circuit configuration for implementing a function of the control unit 30. The control unit 30 may be implemented by cooperation of software and hardware.

The storage unit 20 is implemented, for example, by a nonvolatile storage device such as a ROM (Read Only Memory), an EEPROM (Electrically Erasable and Programmable Read Only Memory), and a HDD (Hard Disk Drive) and a volatile storage device such as a RAM (Random Access Memory) and a register. The storage unit 20 stores a control program 22, a communication control program 24 and the like. The storage unit 20 has a temporary storage area 26 including a transmission buffer (not shown) and a reception buffer (not shown).

The control program 22 is a program for controlling a device and the like allocated to the ECU 10. The communication control program 24 is a program for controlling communication of the ECU 10.

The control unit 30 includes a device control section 32 and an ECU-side communication control section 34. The device control section 32 is implemented by executing the control program 22 and performs a control allocated to the ECU 10.

The ECU-side communication control section 34 is implemented by executing the communication control program 24 and controls the communication of the ECU 10. The ECU-side communication control section 34 acquires information included in a frame f to be processed and stores the information in the temporary storage area 26 of the storage unit 20.

The ECU-side communication control section 34 allows the communication unit 40 to transmit the frame f on the basis of information input to the ECU 10, information included in the acquired frame f, the communication control program 24 and the like. The communication unit 40 communicates with another device on the basis of a control of the ECU-side communication control section 34.

Figure 3:
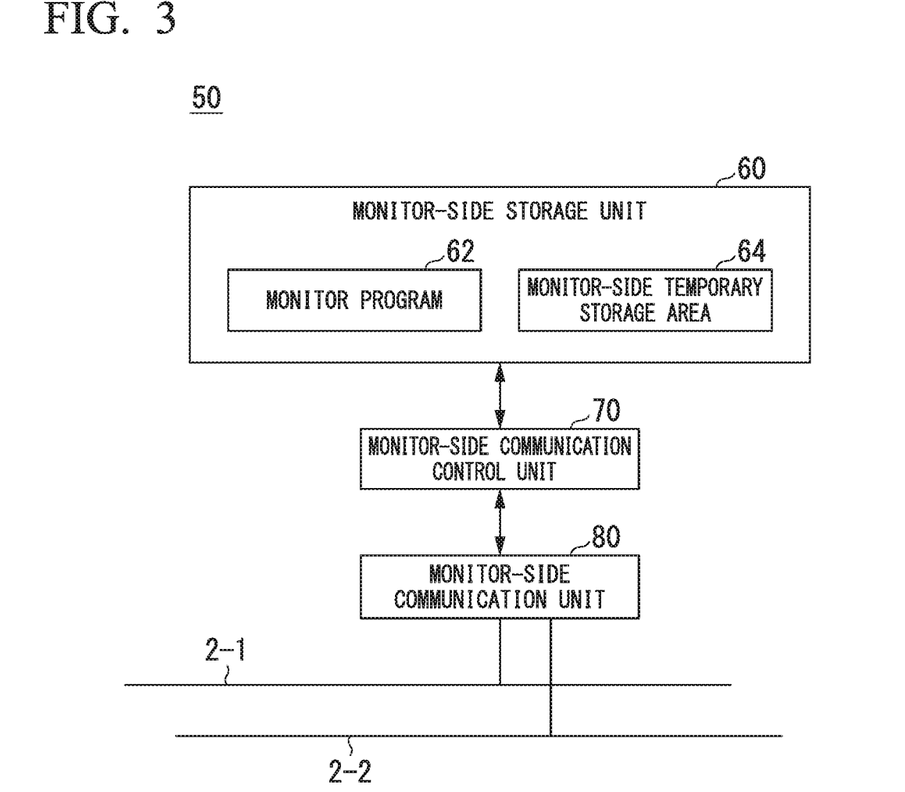
FIG. 3 is a view showing a functional configuration of a monitor device.

FIG. 3 is a view showing a functional configuration of a monitor device 50. The monitor device 50 includes a monitor-side storage unit 60, a monitor-side communication control unit (communication control part) 70, and a monitor-side communication unit 80 (communication unit). The monitor-side storage unit 60 is implemented by a nonvolatile storage device such as a ROM and an EEPROM and a volatile storage device such as a RAM and a register. The monitor-side storage unit 60 stores a monitor program 62. The monitor program 62 is a program for performing a monitor process that is performed by the monitor-side communication control unit 70. The monitor-side storage unit 60 has a monitor-side temporary storage area 64 including a transmission buffer (not shown) and a reception buffer (not shown). A processor such as a CPU executes a program stored in the storage unit 20, and thereby, the monitor-side communication control unit 70 is implemented. The monitor-side communication control unit 70 may be implemented by hardware such as a LSI, an ASIC, and a FPGA and may have a circuit configuration for implementing a function of the monitor-side communication control unit 70.

The monitor-side communication control unit 70 is implemented by executing the monitor program 62 and performs a monitor process described below. The monitor-side communication control unit 70 stores information that is included in acquired frame f in the monitor-side temporary storage area 64 of the monitor-side storage unit 60. The monitor-side communication control unit 70 transmits the frame f that is stored in the monitor-side temporary storage area 64 to another ECU 10 via the communication path 2 by using the monitor-side communication unit 80.

When a traffic of the first communication path 2-1 is more than a threshold value, the monitor-side communication control unit 70 performs a control (monitor process) such that a relationship between the number m1 of signals which are received from the first communication path and the number m2 of signals which are transmitted to the second communication path becomes m1>m2 in a predetermined time span (first predetermined time span). Details of the monitor process are described below. A case in which the traffic of the first communication path 2-1 is more than a threshold value is, for example, a case in which a predetermined signal is received at a shorter period than a predetermined period or a case in which the number of predetermined signals which are received from the first communication path 2-1 is larger than a preset number in a predetermined time span (second predetermined time span). The first predetermined time span may be the same time span as the second predetermined time span or may be a different time span from the second predetermined time span. The monitor-side communication unit 80 communicates with another device on the basis of the control of the monitor-side communication control unit 70.

Figure 4:
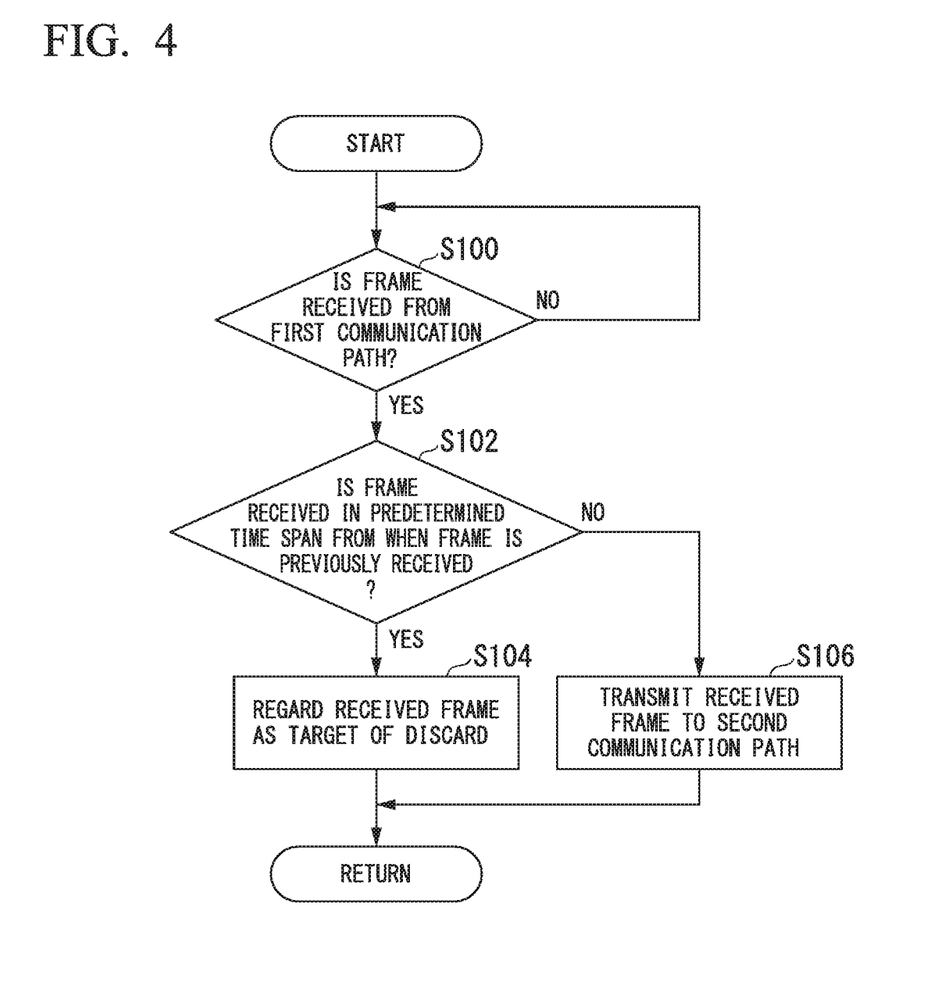
FIG. 4 is a flowchart showing a flow of a monitor process.

FIG. 4 is a flowchart showing a flow of a monitor process. First, the monitor-side communication control unit 70 waits until a frame f is received from the first communication path 2-1 (Step S100). When receiving a frame f from the first communication path 2-1, the monitor-side communication control unit 70 determines whether or not the frame f is received in a predetermined time span from when a frame f is previously received (Step S102). When the frame f is received in the predetermined time span from when a frame f is previously received, the monitor-side communication control unit 70 determines that the traffic of the first communication path 2-1 is more than the threshold value, does not transmit the received frame f, and regards the received frame f as a target of discard (Step S104). The discard means that the frame f that is stored in the reception buffer is overwritten with a frame f that is received next without transmitting the frame f that is stored in the reception buffer.

When the frame f is not received in the predetermined time span from when a frame f is previously received, the monitor-side communication control unit 70 transmits the received frame f to the second communication path 2-2 (Step S106). Thereby, the process of one routine of the present flowchart is finished.

In the process of Step S104, the frames f on which it is determined whether or not the traffic is more than the threshold value may be frames f to which the same identifier is assigned or may be frames f that are transmitted independent of the identifier.

Figure 5:
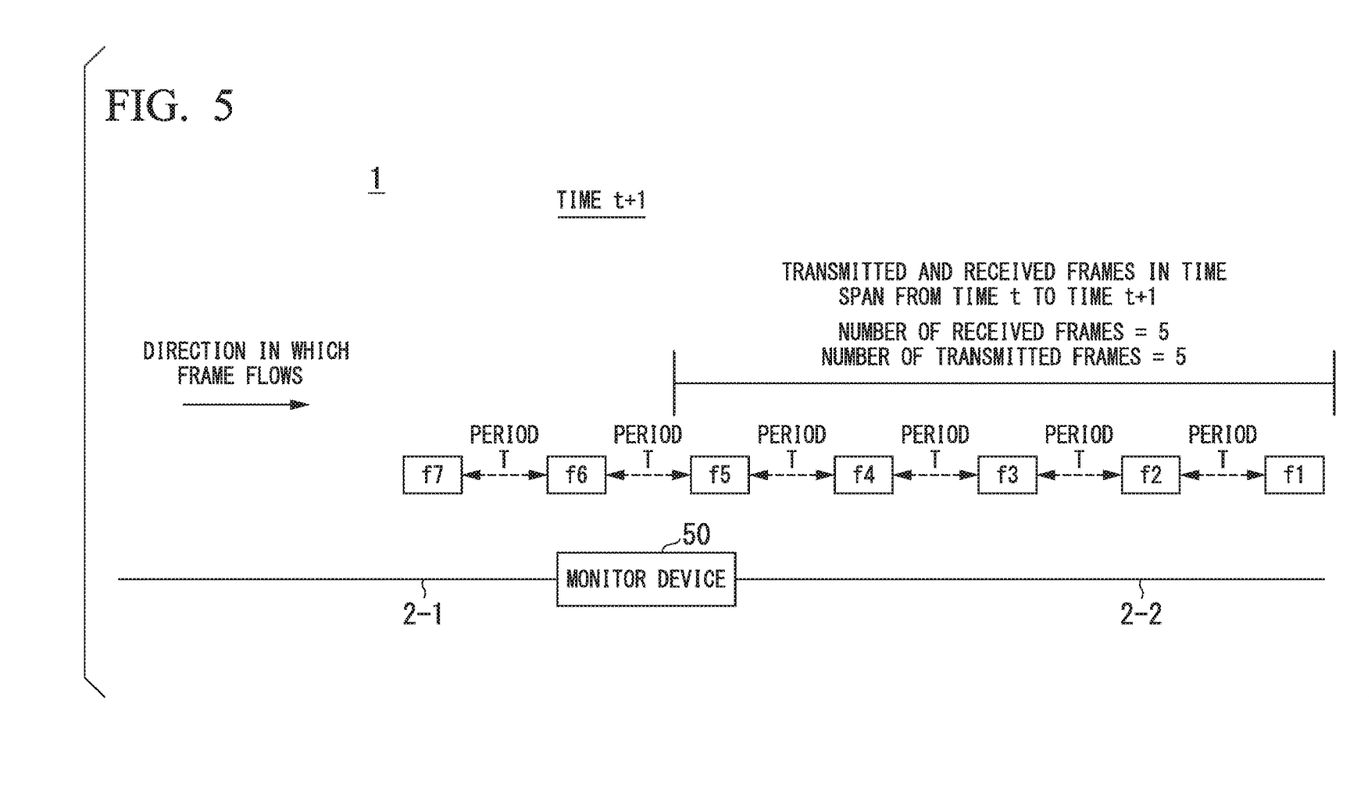
FIG. 5 is a view showing a process of a monitor device of a comparison example.

FIG. 5 is a view showing a process of a monitor device of a comparison example. In the example shown in FIG. 5, it is assumed that a frame f1 to a frame f7 are transmitted in this order at a period P toward the monitor device 50 via the first communication path 2-1. In this case, the monitor device described above stores the received frame f in the monitor-side temporary storage area and then transmits the frame f that is stored in the monitor-side temporary storage area to another device (for example, ECU 10-2) via the second communication path by using the monitor-side communication unit. That is, the monitor device transmits the frame f to the second communication path 2-2 at each time when the frame f is received.

For example, when focusing on a period of time from a time t (for example, when the frame f1 is received by the monitor device) to a time t+1 (for example, when the frame f5 is transmitted), as shown in FIG. 5, in the period of time from the time t to the time t+1, transmitted and received frames are frames f1 to f5, and the number of received frames f is the same as the number of transmitted frames f. In this way, when the monitor device transmits the frame f to the second communication path 2-2 at each time when the frame f is received, the traffic of the first communication path 2-1 propagates to the second communication path 2-2 as is, and the traffic of the second communication path 2-2 becomes large.

For example, when the network is attacked by transmitting illegal frames at a predetermined traffic or more to the first communication path 2-1 from an external device that is connected to the network, the traffic of the first communication path 2-1 propagates to the second communication path 2-2, and there may be a case in which it is impossible to transmit and receive information that is required for an essential control.

Figure 6:
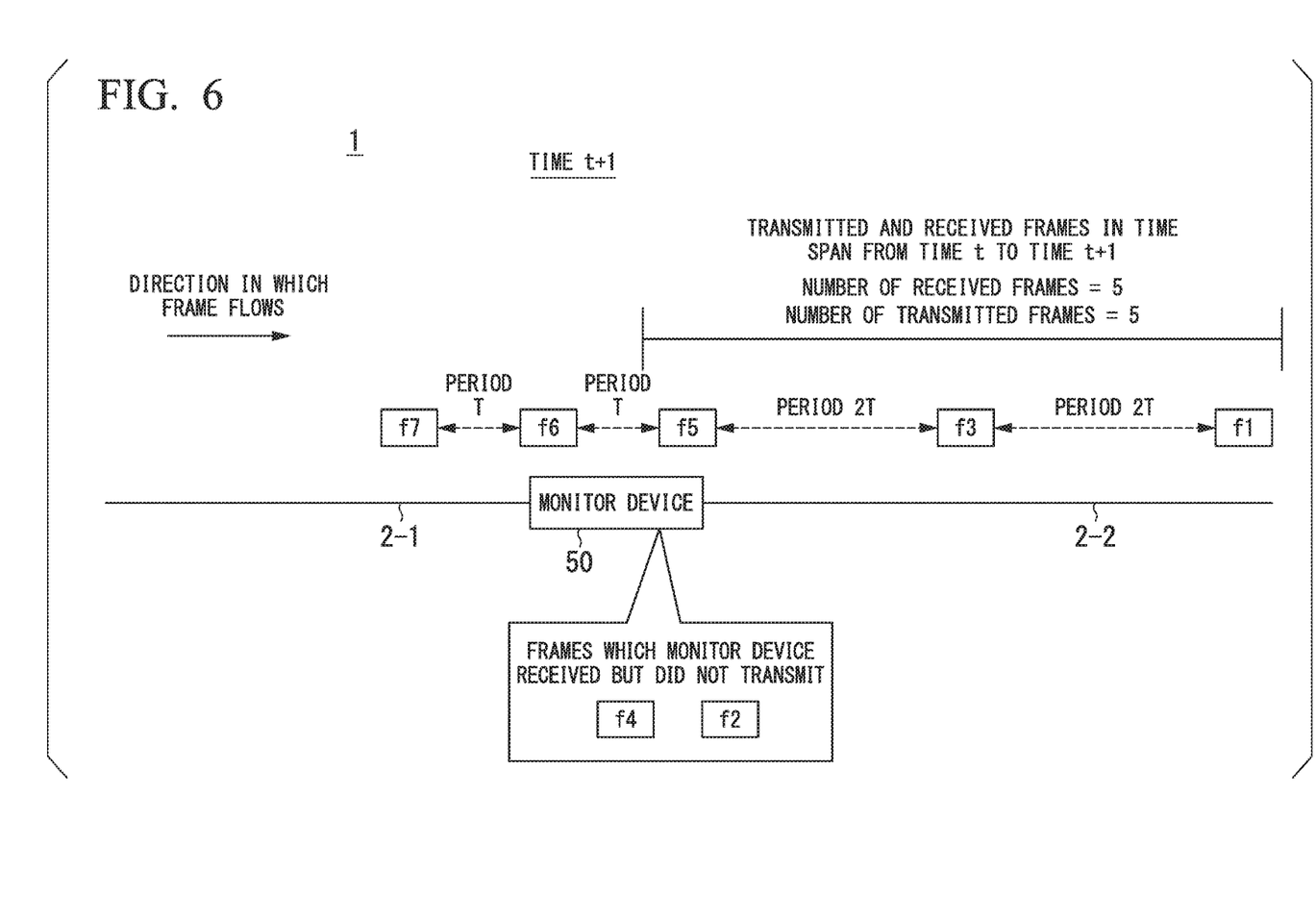
FIG. 6 is a view showing a process of a monitor device of the present embodiment.

On the other hand, the monitor device 50 of the present embodiment can prevent the traffic of the first communication path 2-1 from propagating to the second communication path 2-2. FIG. 6 is a view showing a process of the monitor device 50 of the present embodiment. Descriptions that overlap with those of FIG. 5 described above are omitted. When the traffic of the first communication path 2-1 is more than a threshold value, the monitor device 50 performs a control such that a relationship between the number m1 of frames f which are received from the first communication path 2-1 and the number m2 of frames f which are transmitted to the second communication path 2-2 becomes m1>m2. A case in which the traffic is more than a threshold value means that in the example of FIG. 6, frames are transmitted at a period that is equal to or less than the period T. The predetermined signals may be signals to which the same identifier is assigned or may be signals to which a different identifier is assigned.

For example, when focusing on a period of time from a time t to a time t+1, although the monitor-side communication control unit 70 receives the frame f at each period T, the monitor-side communication control unit 70 transmits a frame f1, then transmits a frame f (frames f3 and f5) at each period 2T to the communication path 2-2, and discards a frame f (for example, frames f2 and f4) that is received but that is not transmitted. That is, when the number of frames f that are received from the first communication path 2-1 in the first predetermined time span is more than a predetermined number, the monitor-side communication control unit 70 transmits the frame f to the second communication path 2-2 at a period that is longer compared to a period at which a signal is received from the first communication path 2-1.

For example, when the number of frames f that are received from the second communication path 2-2 in a predetermined time span (third predetermined time span) is more than a predetermined number, the ECU 10-2 determines the abnormality of the communication state. In this case, the monitor-side communication control unit 70 transmits a signal to the second communication path 2-2 at a period that is longer compared to a period at which a signal is received from the first communication path 2-1 such that the ECU 10-2 does not determine the abnormality of the communication state (such that the ECU 10-2 does not receive frames f of which the number is more than a predetermined number from the second communication path 2-2 in the third predetermined time span. The monitor-side storage unit 60 of the monitor device 50 stores a condition when the ECU 10-2 determines the abnormality of the communication state.

The third predetermined time span may be the same time span as the first predetermined time span or the second predetermined time span or may be a different time span from the first predetermined time span and the second predetermined time span.

According to the process described above, in the period of time from the time t to the time t+1, the number m1 of received frames f is more than the number m2 of transmitted frames f. As a result, the monitor device 50 can prevent the traffic of the first communication path 2-1 from propagating to the second communication path 2-2.

According to the first embodiment described above, the monitor device 50 includes: the monitor-side communication unit 80 that is connected to the first communication path 2-1 and the second communication path 2-2; and the monitor-side communication control unit 70 that controls the monitor-side communication unit 80 and that transmits a signal to the second communication path 2-2 on the basis of a signal which is received from the first communication path 2-1, wherein when the traffic of the first communication path 2-1 is more than a threshold value, the monitor-side communication control unit 70 performs a control such that the relationship between the number m1 of signals which are received from the first communication path 2-1 and the number m2 of signals which are transmitted to the second communication path becomes m1>m2, and thereby, it is possible to prevent the receiving-side communication state from propagating to the transmitting-side communication path.

In order to "perform a control such that the relationship between the number m1 of signals which are received from the first communication path 2-1 and the number m2 of signals which are transmitted to the second communication path 2-2 becomes m1>m2", the monitor-side communication control unit 70 may "perform a control such that the relationship between the number (m1) of signals which are received from the first communication path 2-1 in a first predetermined time span and the number (m2) of signals which are transmitted to the second communication path 2-2 on the basis of the signals which are received from the first communication path 2-1 in the first predetermined time span becomes m1>m2", and thereby, it is also possible to obtain similar advantages.

Modified Example of First Embodiment

In a modified example of the first embodiment, the monitor-side communication control unit 70 performs a control such that the relationship between the number m1 of signals which are received from the first communication path 2-1 and the number m2 of signals which are transmitted to the second communication path 2-2 becomes m1>m2 when the number of signals that are received from the first communication path 2-1 in a time span (first predetermined time span) from when the monitor device transmits a signal to the second communication path 2-2 to when the predetermined period comes next is more than a predetermined number. The predetermined number is, for example, "one". Hereinafter, differences from the first embodiment are mainly described.

Figure 7:
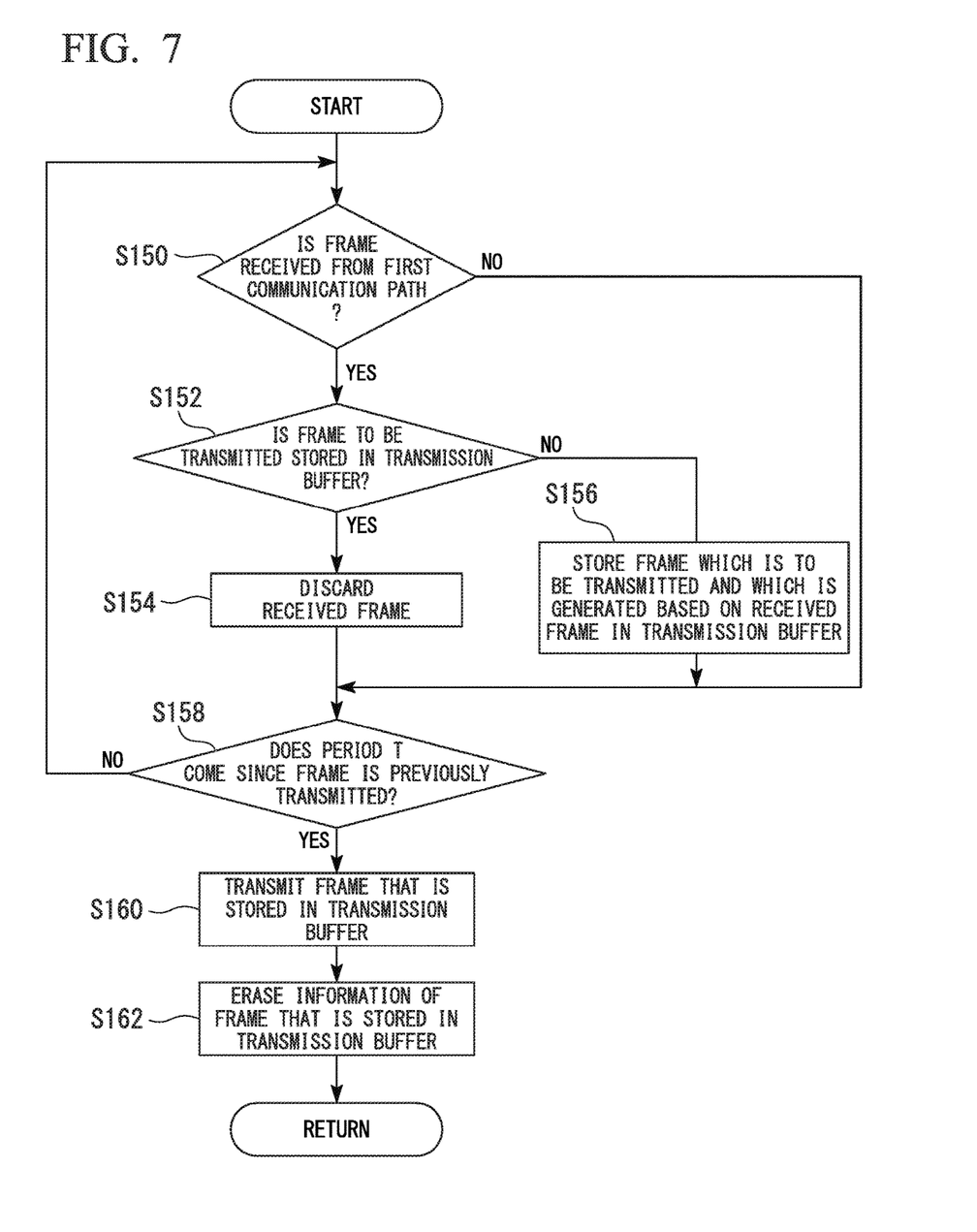
FIG. 7 is a flowchart showing a flow of a monitor process of a modified example of a first embodiment.

FIG. 7 is a flowchart showing a flow of a monitor process of the modified example of the first embodiment. First, the monitor-side communication control unit 70 waits until a frame f is received from the first communication path 2-1 (Step S150). When receiving a frame f from the first communication path 2-1, the monitor-side communication control unit 70 determines whether or not a frame f to be transmitted is stored in the transmission buffer (Step S152). When a frame f to be transmitted is stored in the transmission buffer, the monitor-side communication control unit 70 discards the received frame f (Step S154). That is, the monitor-side communication control unit 70 does not generate a frame f to be transmitted on the basis of the received frame f.

When a frame f to be transmitted is not stored in the transmission buffer, the monitor-side communication control unit 70 generates a frame f to be transmitted on the basis of the received frame f and stores the generated frame f in the transmission buffer (Step S156).

Next, the monitor-side communication control unit 70 determines whether or not a period T elapses since a frame f is previously transmitted (Step S158). If the period T has not elapsed since a frame f is previously transmitted, the routine returns to the process of Step S150. If the period T has elapsed since a frame f is transmitted, the monitor-side communication control unit 70 transmits a frame f that is stored in the transmission buffer (Step 160). Next, the monitor-side communication control unit 70 erases the information of the transmitted frame f from the transmission buffer (Step S162). Thereby, the process of one routine of the present flowchart is finished.

Figure 8:
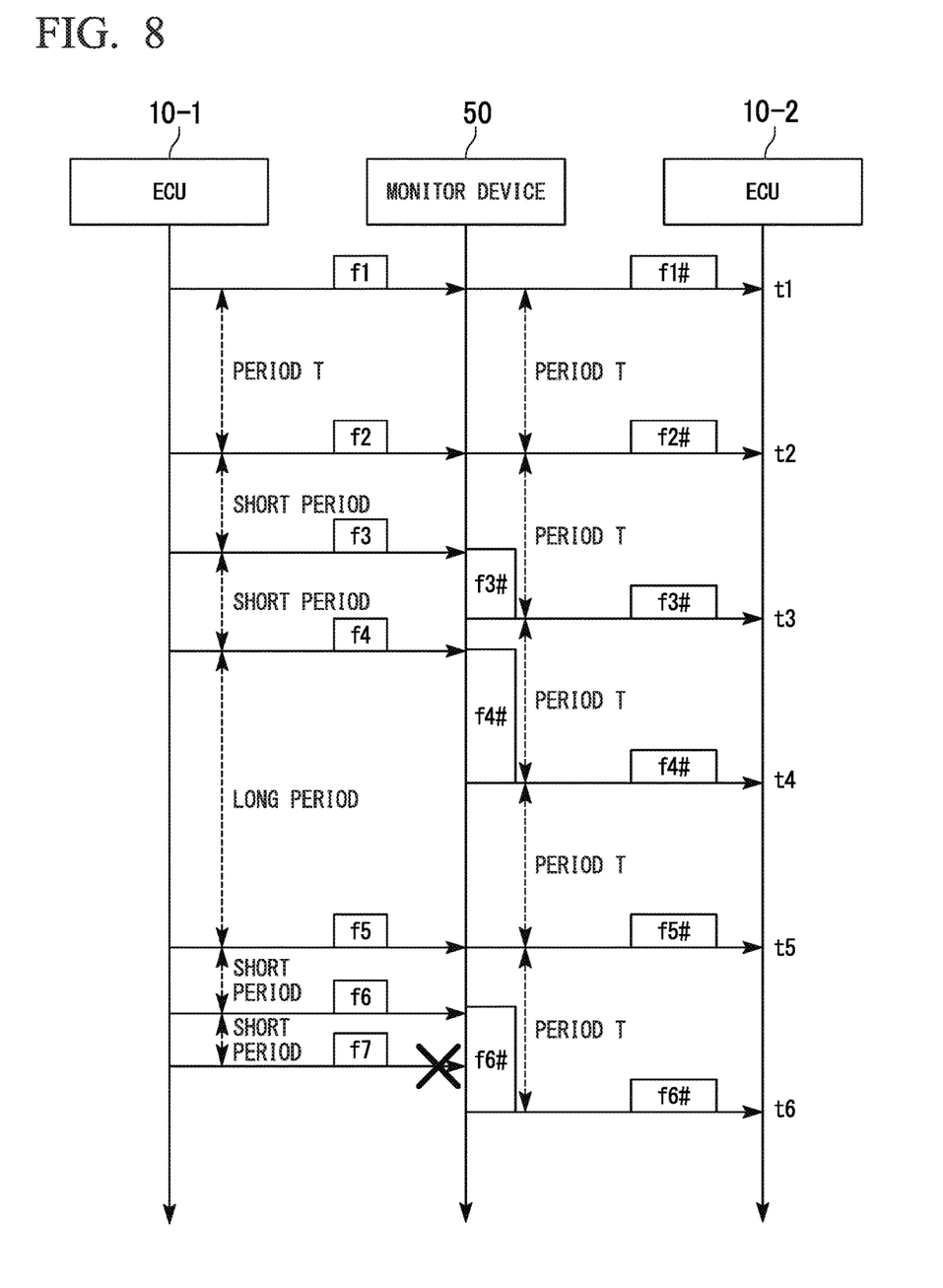
FIG. 8 is a timing chart in a monitor process of a modified example of the first embodiment.

FIG. 8 is a timing chart in the monitor process of the modified example of the first embodiment. In the example shown in FIG. 8, it is assumed that the ECU 10-1 transmits a predetermined frame f to the monitor device 50, and the monitor device 50 that receives the predetermined frame f transmits, to the ECU 10-2, a frame f# on the basis of the frame f that is received at each predetermined period. The time span between time points of a time t1 to a time t6 corresponds to the period T.

When the ECU 10-1 transmits a frame f1 to the monitor device 50 at the time t1, the monitor-side communication control unit 70 of the monitor device 50 transmits, to the ECU 10-2, a frame f1# on the basis of the received frame f1. At this time, when receiving the frame f1, the monitor-side communication control unit 70 stores the frame f1 in the reception buffer. Further, the monitor-side communication control unit 70 generates a frame f1# to be transmitted on the basis of the information that is stored in the reception buffer and stores the generated frame f1# in the transmission buffer. Then, the monitor-side communication control unit 70 transmits the frame f1# that is stored in the transmission buffer.

When the ECU 10-1 transmits a frame f2 to the monitor device 50 at a time t2, the monitor-side communication control unit 70 of the monitor device 50 transmits, to the ECU 10-2, a frame f2# on the basis of the received frame f2.

When the ECU 10-1 transmits a frame f3 to the monitor device 50 in a time span from the time t2 to a time t3, the monitor-side communication control unit 70 of the monitor device 50 stores a frame f3# on the basis of the received frame f3 in the transmission buffer. Then, when the predetermined period comes since the frame f2# is previously transmitted (at the time t3), the monitor-side communication control unit 70 transmits the frame f3# that is stored in the transmission buffer to the ECU 10-2.

When the ECU 10-1 transmits a frame f4 to the monitor device 50 in a time span from the time t3 to a time t4, similarly to the above process, the monitor-side communication control unit 70 of the monitor device 50 stores a frame f4# on the basis of the received frame f4 in the transmission buffer. Then, when the predetermined period comes since the frame f3# is previously transmitted (at the time t4), the monitor-side communication control unit 70 transmits, to the ECU 10-2, the frame f4# that is stored in the transmission buffer.

When the ECU 10-1 transmits a frame f5 to the monitor device 50 at a time t5, the monitor-side communication control unit 70 of the monitor device 50 transmits a frame f5# on the basis of the received frame f5 to the ECU 10-2.

When the ECU 10-1 transmits a frame f6 and a frame f7 in this order in a time span from the time t5 to a time t6, the monitor-side communication control unit 70 of the monitor device 50 stores a frame f6# on the basis of the received frame f6 in the transmission buffer. After that, although the monitor device 50 receives the frame f7, the transmission buffer stores the frame f6# that has not been transmitted, and therefore, the monitor-side communication control unit 70 discards the received frame f7. Then, at the time t6, the monitor-side communication control unit 70 transmits the frame f6# that is stored in the transmission buffer to the ECU 10-2.

As described above, when a frame f is received from the ECU 10-1 in a state where a frame f that has not been transmitted is stored in the transmission buffer, the monitor-side communication control unit 70 discards the received frame f, and thereby, it is possible to prevent the receiving-side communication state from propagating to the transmitting-side communication path.

In the modified example of the first embodiment described above, the monitor-side communication control unit 70 performs a control such that the relationship between the number m1 of signals which are received from the first communication path 2-1 and the number m2 of signals which are transmitted to the second communication path 2-2 becomes m1>m2 when the number of signals that are received from the first communication path 2-1 in a time span (first predetermined time span) from when the monitor device transmits a signal to the second communication path 2-2 to when the predetermined period comes next is more than "one", and thereby, it is possible to prevent the receiving-side communication state from propagating to the transmitting-side communication path.

In order to "perform a control such that the relationship between the number m1 of signals which are received from the first communication path 2-1 and the number m2 of signals which are transmitted to the second communication path 2-2 becomes m1>m2", the monitor-side communication control unit 70 may "perform a control such that the relationship between the number (m1) of signals which are received from the first communication path 2-1 in a first predetermined time span and the number (m2) of signals which are transmitted to the second communication path 2-2 on the basis of the signals which are received from the first communication path 2-1 in the first predetermined time span becomes m1>m2", and thereby, it is also possible to obtain similar advantages.

Second Embodiment

Hereinafter, a second embodiment is described. In the first embodiment, a process that is performed by the monitor device is described without considering an identifier that is assigned to a transmitted and received frame f. On the other hand, in the second embodiment, a process when an identifier is considered is described. Differences from the first embodiment are mainly described, and descriptions of a function and the like that are common to those of the first embodiment are omitted.

Figure 9:
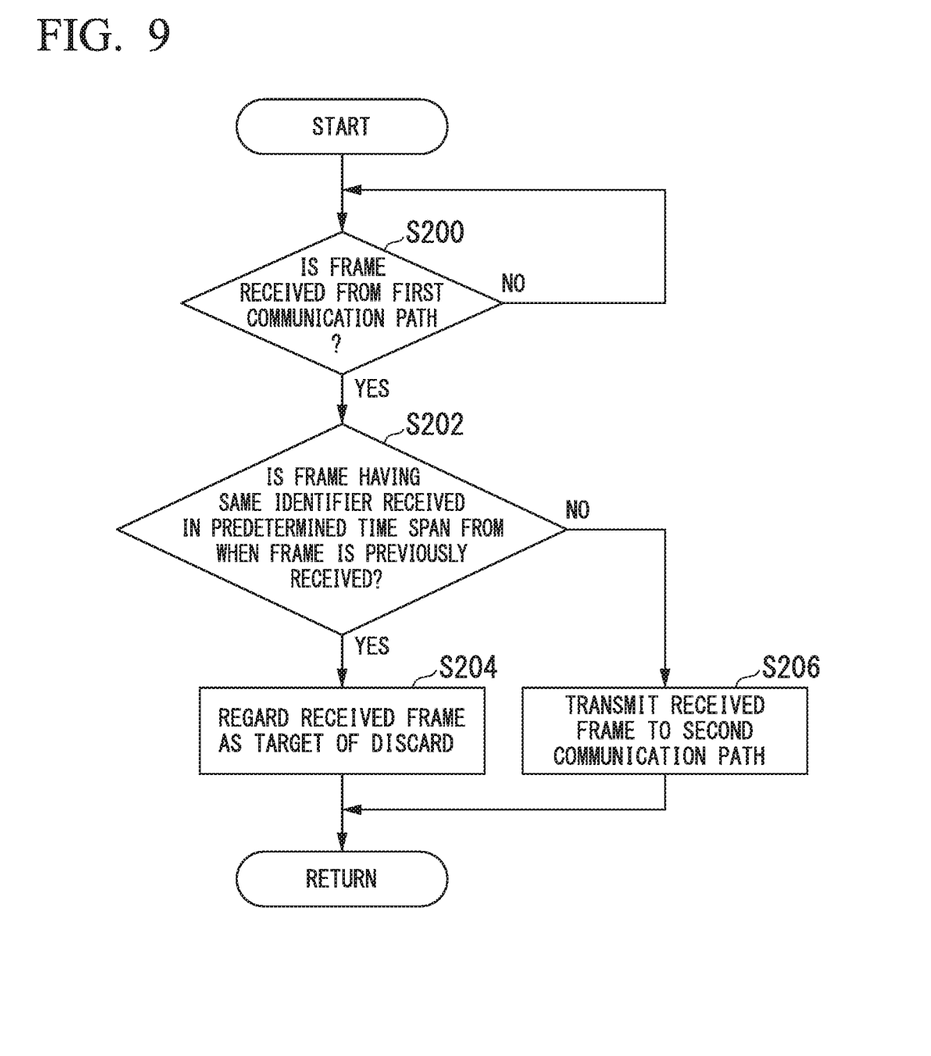
FIG. 9 is a flowchart showing a flow of a monitor process of a second embodiment.

FIG. 9 is a flowchart showing a flow of a monitor process of the second embodiment. The process of the present flowchart is not limited to a case in which the identifiers of transmitted and received frames are identical and includes a case in which the identifiers of transmitted and received frames are different from one another.

First, the monitor-side communication control unit 70 waits until a frame f is received from the first communication path 2-1 (Step S200). When receiving a frame f from the first communication path 2-1, the monitor-side communication control unit 70 determines whether or not a frame f having the same identifier as an identifier of a frame f that is received in Step S200 is received in a predetermined time span from when a frame f is previously received (Step S202). When the frame f having the same identifier is received in the predetermined time span in Step S202, the monitor-side communication control unit 70 regards the received frame f as a target of discard (Step S204).

When the frame f having the same identifier is not received in the predetermined time span in Step S202, the monitor-side communication control unit 70 transmits the received frame f to the second communication path 2-2 (Step S206). Thereby, the process of one routine of the present flowchart is finished.

Figure 10:
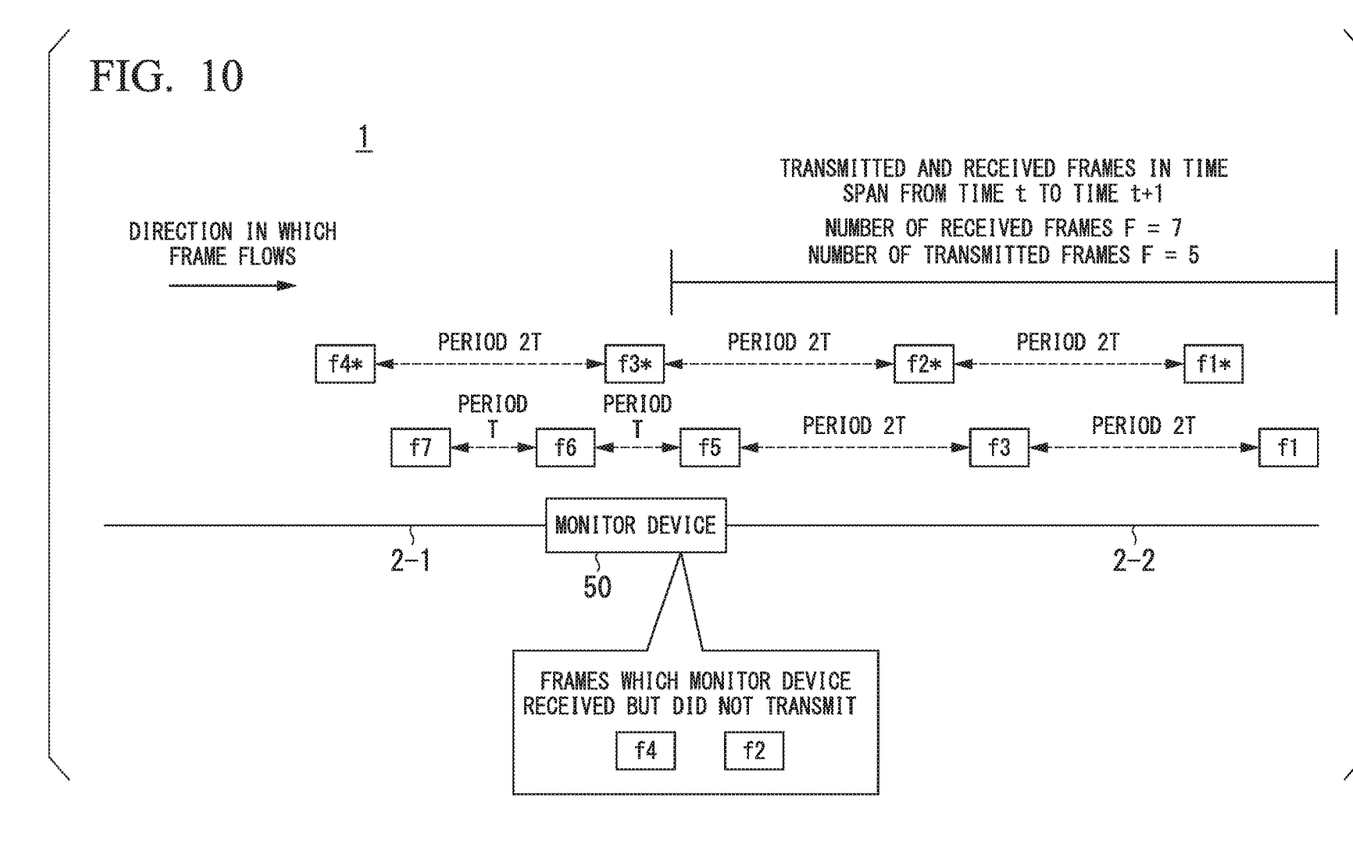
FIG. 10 is a view showing a process of a monitor device of a second embodiment.

FIG. 10 is a view showing a process of a monitor device 50 of the second embodiment. Descriptions that overlap with those of FIG. 5 or FIG. 6 described above are omitted. In FIG. 10, it is assumed that frames f1 to f7 have an identical identifier, and frames f1* to f4* have an identical identifier (an identifier that is different from the identifier which the frame f1 to f7 have). When the traffic of the first communication path 2-1 is more than a threshold value, the monitor-side communication control unit 70 performs a control such that with respect to the frames f having an identical identifier, a relationship between the number m1 of frames f which are received from the first communication path 2-1 and the number m2 of frames f which are transmitted to the second communication path 2-2 becomes m1>m2.

For example, when focusing on a period of time from a time t to a time t+1, when the monitor-side communication control unit 70 receives and transmits a frame f1 and then receives a frame f1* before a period T elapses, the identifier of the frame f1 is different from the identifier of the frame f1*, and therefore, the monitor-side communication control unit 70 transmits the frame f1* to the second communication path 2-2. On the other hand, when the monitor-side communication control unit 70 receives and transmits the frame f1 and then receives a frame f2 when the period T elapses, the monitor-side communication control unit 70 does not transmit the frame f2 to the second communication path 2-2 and discards the frame f2. For example, as shown in FIG. 10, a case is considered in which a frame f is received at each period T, a frame f* is received at each period 2T, and each of frames f1*, f2*, f3* is received immediately after each of frames f1, f3, f5 is received. In this case, the monitor device 50 discards frames f2 and f4 of frames f that are transmitted at each period T but transmits frames f1*, f2*, and f3* having an identifier different from that of the frames f to another device via the second communication path 2-2.

According to the process described above, in the period of time from the time t to the time t+1, the number m1 of received frames f is more than the number m2 of transmitted frames f. As a result, the monitor device 50 can prevent the traffic of the first communication path 2-1 from propagating to the second communication path 2-2. Further, with respect to the frames f* that are transmitted at the period 2T, a control that limits the transmission of frames is not performed, and therefore, it is possible to promptly transmit a required frame to another device.

According to the second embodiment described above, when the traffic of the first communication path 2-1 is more than a threshold value, the monitor-side communication control unit 70 performs a control such that with respect to signals having an identical identifier, a relationship between the number m1 of signals which are received from the first communication path 2-1 and the number m2 of signals which are transmitted to the second communication path 2-2 becomes m1>m2, and thereby, it is possible to provide the advantages of the first embodiment and to promptly transmit a required frame to another device.

In order to "perform a control such that the relationship between the number m1 of signals which are received from the first communication path 2-1 and the number m2 of signals which are transmitted to the second communication path 2-2 becomes m1>m2", the monitor-side communication control unit 70 may "perform a control such that the relationship between the number (m1) of signals which are received from the first communication path 2-1 in a first predetermined time span and the number (m2) of signals which are transmitted to the second communication path 2-2 on the basis of the signals which are received from the first communication path 2-1 in the first predetermined time span becomes m1>m2", and thereby, it is also possible to obtain similar advantages.

According to the embodiments described above, it is possible to prevent the receiving-side communication state from propagating to the transmitting-side communication path by including: the monitor-side communication unit 80 that is capable of communicating with the first communication path 2-1 and the second communication path 2-2; and the monitor-side communication control unit 70 that controls the monitor-side communication unit 80 and that transmits a signal to the second communication path 2-2 on the basis of a signal which is received from the first communication path 2-1, wherein when the number of signals that are received from the first communication path in a first predetermined time span is more than a predetermined number, the monitor-side communication control unit 70 performs a control such that the relationship between the number m1 of signals which are received from the first communication path 2-1 and the number m2 of signals which are transmitted to the second communication path 2-2 becomes m1>m2.

Although embodiments of the invention have been described with reference to the drawings, the present invention is not limited to the embodiments, and a variety of changes and substitutions can be added without departing from the scope of the invention.

What is claimed is:

1. A communication apparatus comprising:
   a communication unit that is capable of communicating with a first communication path and a second communication path; and
   a communication control part that controls the communication unit and that transmits a signal to the second communication path based on a signal which is received from the first communication path, wherein
   when a number of signals that are received from the first communication path in a first predetermined time span is more than a predetermined number, the communication control part performs a control such that a relationship between a number m1 of signals which are received from the first communication path and a number m2 of signals which are transmitted to the second communication path becomes m1>m2, and
   when the number of signals that are received from the first communication path in the first predetermined time span is not more than the predetermined number, the communication control part performs a control such that the relationship between the number m1 of signals which are received from the first communication path and the number m2 of signals which are transmitted to the second communication path becomes m1=m2.

2. The communication apparatus according to claim 1, wherein when a number of signals that are received from the first communication path in the first predetermined time span is more than a predetermined number, the communication control part transmits the signal to the second communication path at a period that is longer compared to a period at which a signal is received from the first communication path.

3. The communication apparatus according to claim 1, wherein the communication control part transmits the signal to the second communication path at a predetermined period.

4. The communication apparatus according to claim 3, wherein the first predetermined time span is a time span from when the communication control part transmits a signal to the second communication path to when the predetermined period comes next, and the predetermined number is one.

5. The communication apparatus according to claim 1, wherein when a number of signals that have a predetermined identifier and that are received from the first communication path in the first predetermined time span is more than a predetermined number, the communication control part performs a control such that with respect to the signal having a predetermined identifier, a relationship between a number m1 of signals which are received from the first communication path and a number m2 of signals which are transmitted to the second communication path becomes m1>m2.

6. A communication method in which a computer provided on a vehicle controls a communication unit that is capable of communicating with a first communication path and a second communication path to transmit a signal to the second communication path based on a signal which is received from the first communication path, the method comprising:

determining whether or not a number of signals that are received from the first communication path in a first predetermined time span is more than a predetermined number based on a reception result of a signal from the first communication path;

when it is determined that the number is more than the predetermined number, performing a control such that a relationship between a number m1 of signals which are received from the first communication path and a number m2 of signals which are transmitted to the second communication path becomes m1>m2; and when it is determined that the number is not more than the predetermined number, performing a control such that the relationship between the number m1 of signals which are received from the first communication path and the number m2 of signals which are transmitted to the second communication path becomes m1=m2.

7. A non-transitory computer-readable recording medium including a program that causes a computer provided on a vehicle to control a communication unit which is capable of communicating with a first communication path and a second communication path to transmit a signal to the second communication path based on a signal which is received from the first communication path, the program causing the computer to:

determine whether or not a number of signals that are received from the first communication path in a first predetermined time span is more than a predetermined number based on a reception result of a signal from the first communication path;

when it is determined that the number is more than the predetermined number, perform a control such that a relationship between a number m1 of signals which are received from the first communication path and a number m2 of signals which are transmitted to the second communication path becomes m1>m2; and when it is determined that the number is more than the predetermined number, perform a control such that the relationship between the number m1 of signals which are received from the first communication path and the number m2 of signals which are transmitted to the second communication path becomes m1=m2.

* * * * *